June 15, 1965  V. R. NILSSON  3,189,268
DEVICE FOR DETERMINING THE POSITION OF THE INTERFACE BETWEEN
TWO SEPARATED COMPONENTS IN A CENTRIFUGAL SEPARATOR
Filed Dec. 17, 1962  5 Sheets-Sheet 3

INVENTOR.
Vilgot Raymond Nilsson
BY
Davis, Hopie, Faithfull + Hapgood
Attorneys

INVENTOR.
Vilgot Raymond Nilsson
BY
Davis, Hoxie, Faithfull & Hapgood
attorneys

United States Patent Office 3,189,268
Patented June 15, 1965

3,189,268
DEVICE FOR DETERMINING THE POSITION OF THE INTERFACE BETWEEN TWO SEPARATED COMPONENTS IN A CENTRIFUGAL SEPARATOR
Vilgot Raymond Nilsson, Hagersten, Sweden, assignor to Aktiebolaget, Separator, Stockholm, Sweden, a corporation of Sweden
Filed Dec. 17, 1962, Ser. No. 245,228
Claims priority, application Sweden, Dec. 22, 1961, 12,861/61
12 Claims. (Cl. 233—27)

The present invention relates to a device for determining the position of the interface between two separated components in a centrifugal separator.

It has been suggested heretofore to determine the position of the interface with the use of a device for scanning said interface by means of radiation emitted by a light source or a radioactive substance, and a receiver for the radiation. The optical method utilizing a light source has the drawback that it entails difficulties as far as the design is concerned, while the radioactive method has the drawback that the accuracy of measurement is low since the difference in total density between the irradiated material masses is small.

According to the present invention, the above-mentioned drawbacks are eliminated by means of a device which scans the position of the interface according to a capacitive method. More precisely, the new device is characterized by a first capacitor (hereinafter called measuring capacitor) comprising two capacitor elements arranged in the rotor in such way that the interface travels between these elements, and by a second capacitor (hereinafter called transmission capacitor) comprising two other capacitor elements, one located on the outside of the centrifugal rotor and the other one on the inner surface of the stationary housing of the separator. The device also comprises electrical connections connecting both capacitors in series in a circuit, in which a source of current and a capacitance-measuring instrument are inserted.

The invention is based upon the following:
The capacitance of a capacitor is determined by the formula $$C = K \cdot \epsilon \cdot \frac{1}{\delta} \cdot A,$$

where $C$ is the capacitance, $K$ is a constant, $\epsilon$ the dielectric constant of the dielectric, $\delta$ the distance between the capacitor elements (electrically conductive plates or coatings) and $A$ the surface area of the latter. This means that if the interface between the components separated in the centrifugal separator, and serving as a dielectric, is displaced within the space between the elements of the measuring capacitor, the factor $\epsilon$ in the above formula is modified, and therefore the capacitance of the capacitor, provided that the separated components have different dielectric constants. The separated components usually have substantially different dielectric constants, for example, 3–5 for mineral oil and 80 for water.

In order to obtain a high accuracy of measurement, it is important that the transmission capacitor have a high capacitance in relation to the capacitance of the measuring capacitor. This is explained by the fact that if the capacitance of the measuring capacitor is designated by $C_1$, while the capacitance of the transmission capacitor is $C_2$ and the sum of both capacitances is $C_s$, we have (in the case of capacitors connected in series)

$$\frac{1}{C_s} = \frac{1}{C_1} + \frac{1}{C_2}$$

If $C_2$ is high, the relation $1/C_2$ tends to 0 so that $$\frac{1}{C_s} = \frac{1}{C_1}$$

that is, $C_s = C_1$. This means that the value shown by the capacitance-measuring instrument is directly proportional to the displacement of the interface if said displacement occurs between parallel and equally wide capacitor elements.

In an embodiment of the present invention, which is particularly well suited for a centrifuge for the separation of two liquids from each other, one of the elements of the measuring capacitor is formed by a radially extending surface of a member forming a part of the rotor body, preferably a conical disc in the rotor. The other element of the same capacitor is preferably formed by one or more wires extending radially. To provide balance, two such wires may be arranged diametrically. In this connection, the wires may be electrically insulated by means of a material which is highly resistant to deformation under pressure, such as a plastic of the polytetrafluoroethylene type, and lie in close contact against the radially extending surface of the opposing capacitor element, such as said conical disc. Owing to the centrifugal force, the insulated wires are pressed against this radial surface, but if the insulation is not appreciably deformed thereby, the capacitor can satisfactorily scan the position of the interface.

In another embodiment of the present invention, which is particularly well suited for a centrifuge adapted to separate sludge from a liquid, one of the elements of the measuring capacitor is constituted by one or more metal rods, for instance of steel, extending generally parallel to the rotor axis. For reasons of balance, two rods are preferably arranged diametrically in the centrifugal rotor.

The elements of the transmission capacitor are preferably supported in such way that they rest on insulation which separates them from their respective adjacent supports. The electric circuit in which the capacitors are inserted is preferably completed by conductors which are led through the wall of the rotor and the wall of the separator housing and insulated in relation to these walls. The required electrical connection between the rotor and the separator housing is provided in the simplest way by the bearings through which the rotor is journalled in the separator housing. In practice, the separator housing will be grounded electrically. This means that both elements of the transmission capacitor will leak considerably to ground. This leakage, which varies according to circumstances (such as the temperature), causes considerable lack of reliability in the measured values. In order to eliminate this drawback, each of the elements of the capacitor is divided into two portions having the same area, and the two capacitors which these portions form with the ground are connected in opposition to each other in the capacitance-measuring instrument so that their capacitances to ground cancel out each other. Both portions of each capacitor element are preferably constituted by two coaxial rings.

The invention is described more in detail below, reference being made to the attached drawings in which.

Figure 1:
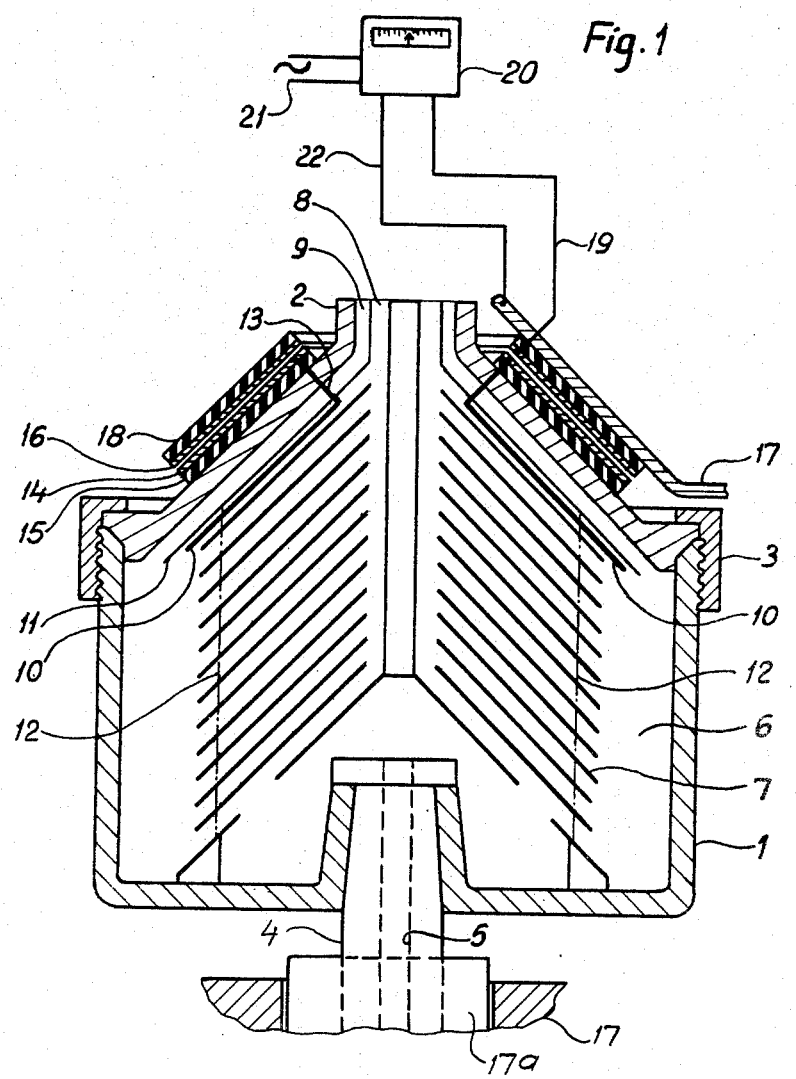
FIG. 1 is a vertical sectional view of a centrifuge embodying one form of the invention.

In FIG. 1 there is shown a continuously operating, hermetically closed separator, as for the separation of water from oil. The hollow rotor body is designated by reference numeral 1 and has a cover or hood 2. The cover 2 is secured to the rotor body 1 by means of a threaded locking ring 3. The rotor is carried by a hollow spindle 4 provided with a central channel 5, by means of which the water-containing oil is fed into the separating chamber 6 and the disk stack 7 arranged in this chamber. The separated oil is discharged through an outlet 8 and the separated water through an outlet 9. Two insulated wires 10 are arranged diametrically in the rotor and extend radially under the top disc 11, toward the underside of which they are urged by centrifugal force during the rotation of the rotor. The wires 10 form one of the elements of the measuring capacitor, and the disk 11 forms the other element. The interface or annular boundary between the separated water and oil is located radially between the inner and the outer ends of the wires 10, as at 12. Each wire 10 is connected by an insulated conductor 13 to a ring-shaped capacitor element or plate 14 which is concentric to the axis of rotation and insulated from the rotor cover 2 by means of an insulating layer 15, such as an epoxy-resin. An opposing ring-shaped, concentric capacitor element 16 is arranged on the inside of the stationary housing 17 which houses the rotor 1, only parts of this housing being shown. An insulating layer 18, such as an epoxy resin, insulates the capacitor plate or element 16 from housing 17. The element 16 is connected by another insulated conductor 19 to a capacitance-measuring instrument 20 which may be of the conventional type including an oscillator suitable for the measurement and which is connected to a source of alternating current 21. The circuit is completed by a conductor 22 connected between the instrument 20 and the separator housing 17 which is electrically connected through the usual bearing assembly 17a to the rotor 1 and hence to the capacitor or disc 11.

For illustrative purposes, assume that the mixture fed through inlet channel 5 is oil and water and that the interface or boundary 12 between the outer annulus of separated water and the inner annulus of separated oil in separating chamber 6 is displaced radially inward for any reason. Such inward displacement of the interface 12 will also occur, of course, in the space between the measuring capacitor elements 10 and 11, resulting in an increase in the volume of water and a decrease in the volume of oil acting as the di-electric in this space. Thus, since the water and oil have substantially different dielectric constants, the overall dielectric constant for the capacitor 10–11 will change in one direction, resulting in a corresponding change in the reading of the capacitance-measuring instrument 20. Conversely, an outward displacement of the interface 12 will increase the volume of oil and decrease the volume of water acting as the dielectric between the capacitor elements 10–11, resulting in the capacitance of this capacitor changing in the opposite direction as indicated by the meter or instrument 20. These capacitance changes will be directly proportional to the amount of the radial displacement of interface 12.

Figure 2:
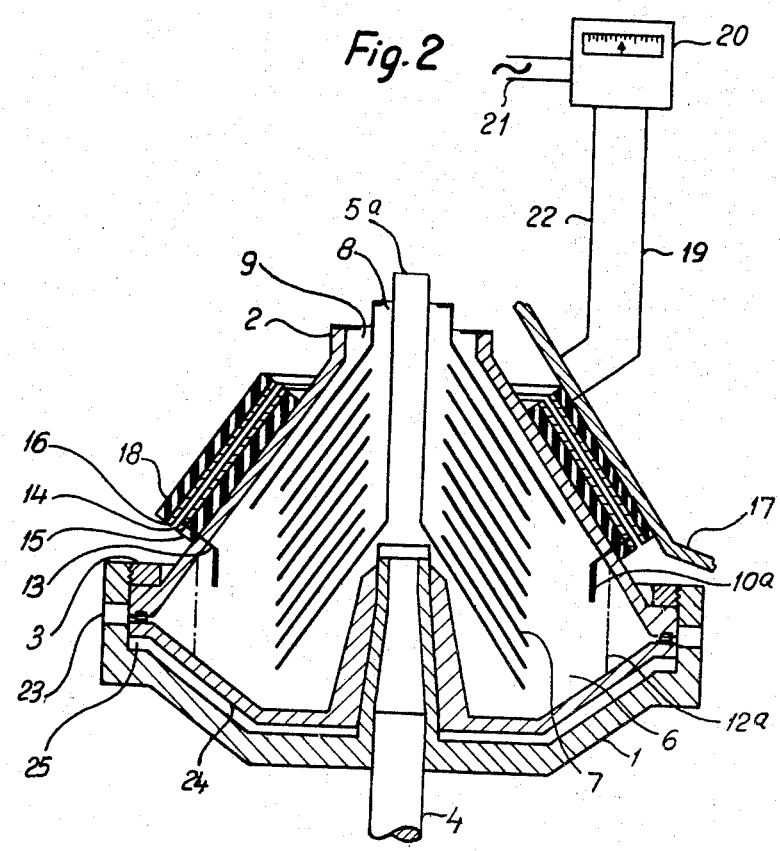
FIG. 2 is a view similar to FIG. 1 but showing a modified form of the invention.

In FIG. 2, the corresponding parts are designated by the same reference numerals as in FIG. 1. According to FIG. 2, the separator is of the self-opening type such as that used for the separation of sludge from water-containing oil. The sludge-containing oil, however, is fed through an open inlet 5a. The outlets 8 and 9 are of the overflow-outlet type. The sludge is periodically discharged through peripheral slots 23 in the rotor body by reciprocation of an axially slidable valve disc 24 operated by means of a liquid which, in the usual manner (not shown) is fed to and discharged from the space 25 between the valve disc 24 and the bottom of the rotor body 1. Reference numeral 10a designates steel rods which are directed generally parallel to the rotor axis and securely fastened in order to enable them to resist the action of the centrifugal force. The rods 10a form a measuring capacitor together with the rotor cover 2. The separator is set to open the slide valve 24 at the latest when the sludge level 12a reaches the rods 10a. If the sludge level 12a moves radially inward beyond the rods 10a, it does not give any useful reading on the measuring instrument 20.

Figure 3:
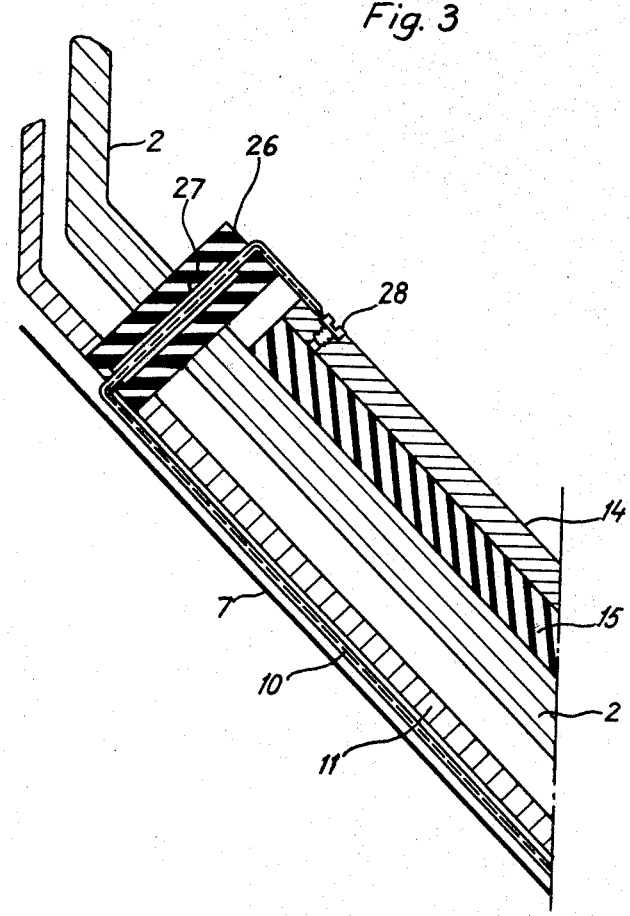
FIG. 3 is an enlarged sectional view of the two capacitors shown in FIG. 1.

Acording to FIG. 3, the wire 10 is led to the outside of the rotor cover 2 through an insulating member or bushing 26 which extends through the top disc 11 and the cover 2 and is provided with a channel 27 for the through-passage of the wire. The wire is further connected to the transmission capacitor element 14 by means of a screw 28.

Figure 4:
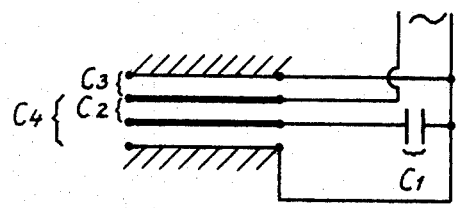
FIG. 4 is a schematic view showing the leakage to ground from the transmission capacitor.

Since in practice the separator housing 17 as well as the rotor 1–2 will be grounded, there will be a considerable leakage of current to ground from both elements 14 and 16 of the transmission capacitor. In FIG. 4 illustrating this condition, $C_1$ designates the capacitance of the measuring capacitor, $C_2$ the capacitance of the transmission capacitor, $C_3$ the capacitance to ground of the element 16 via the separator housing 7 and $C_4$ the capacitance to ground of the same element via the rotor 1–2. Since the transmission capacitor 14, 16 is connected in series with the measuring capacitor 10, 11, and since the capacitance of the former is high, said capacitance can be neglected in the following formula $$C = C_1 + C_3 + C_4$$

Figure 5:
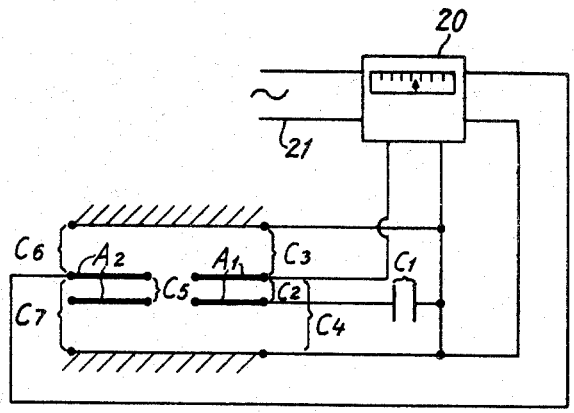
FIG. 5 is a view similar to FIG. 4 but showing the automatic counterbalancing of the transmission capacitor.

The capacitances $C_3$ and $C_4$ are high in relation to the capacitance $C_1$ and, consequently, they eclipse the latter. They must therefore be eliminated in some way so that the measurement values of the measuring capacitor can be utilized. For that purpose the capacitances $C_3$ and $C_4$ could be counterbalanced in the measuring instrument 20 if they were constant. This is, however, not the case, as these capacitances vary according to such changes as the ambient temperature. According to FIG. 5, the capacitances $C_3$ and $C_4$ are eliminated in that each of the elements of the transmission capacitor 14, 16 is divided into two areas $A_1$ and $A_2$ having the same size. Out of the capacitors thus formed only $A_1$, with the self-capacitance $C_2$, and the capacitances $C_3$ and $C_4$ to ground will operate as the transmission capacitor. The capacitor $A_2$, with the self-capacitance $C_5$ ($=C_2$), and the capacitances $C_6$ and $C_7$ ($=C_3$ and $C_4$, respectively) to ground will on the other hand, after being connected in opposition to the capacitor $A_1$ in the measuring instrument 20, permanently and automatically counterbalance entirely the capacitor $A_1$, since both capacitors have the same size and the dielectric between their elements always will remain identical (such as air at the same temperature). Thus, it is possible to write the equation $$C = C_1 + C_3 + C_4 - (C_6 + C_7)$$

which, under the above conditions, can be reduced to $$C = C_1$$

The measuring instrument 20 will therefore only indicate the current flow through the measuring capacitor, so that an accurate value as to the location of the interface will be obtained.

The importance of the counterbalancing described is made evident by the fact that if the temperature variation at the transmission capacitor 14, 16 is 50° C., the variation of the dielectric constant is about 10%. If the capacitance to ground of the transmission capacitor is 600 pF, the error of the reading on the measuring instrument will be 60 pF if no counterbalancing is provided. Further, if the capacitance of the measuring capacitor 10–11 is 10 pF, this value is eclipsed by said capacitance error of 60 pF. However, the automatic counterbalancing described above eliminates entirely the capacitance error in question.

The calibration of the measuring instrument 20 can be carried out in the following way, referring to the embodiment according to FIG. 1. The measuring instrument is zeroed when the rotor 1–2 is empty. The capacitance $C_x$ is read off the instrument 20 when a lightweight component covers the whole length of the wire 10. $C_x$ indicates then a position of the interface corresponding to the outer end of the wire 10. A position of the interface corresponding to the inner end of the wire 10 is indicated by the capacitance $C_y$ which is equal to $$C_x \cdot \frac{\epsilon_1}{\epsilon_2}$$

where $\epsilon_1$=the dielectric constant for a heavy component and $\epsilon_2$=the dielectric constant for a lightweight component. Values between $C_x$ and $C_y$ thus indicate linearly the position of the interface between the inner and the outer end of the wire 10.

Figure 6:
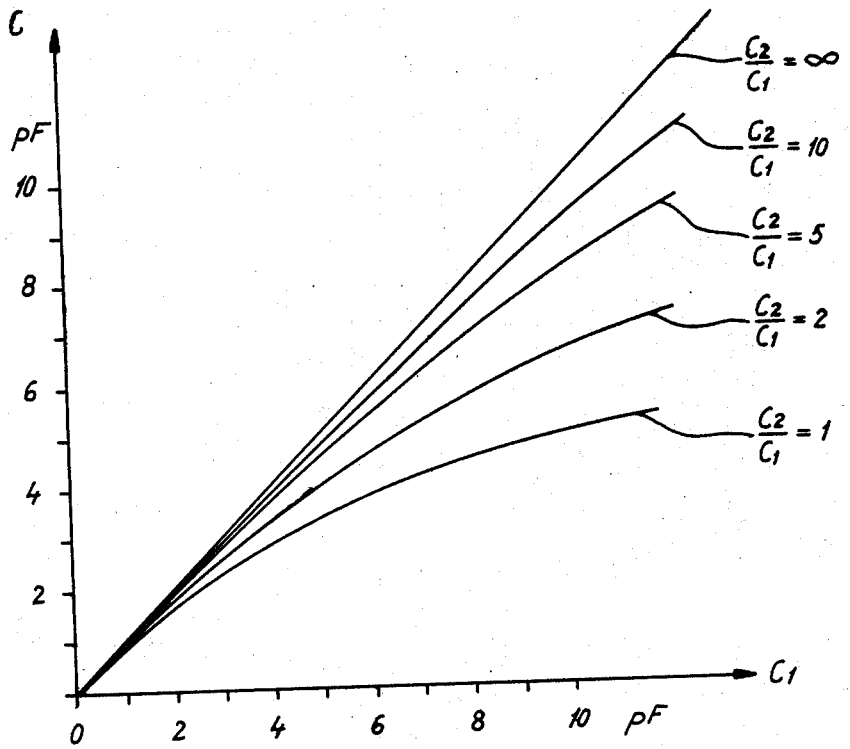
FIG. 6 is a diagram showing the function of the measured value in relation to the capacitance of both capacitors.

The influence of the relation between the capacitance $C_2$ of the transmission capacitor and the capacitance $C_1$ of the measuring capacitor (note FIG. 4) on the accuracy of measurement appears from the diagram shown in FIG. 6, where it is assumed that the capacitance C of both capacitors which are connected in series is determined by the formula $$\frac{1}{C} = \frac{1}{C_1} + \frac{1}{C_2}$$

The diagram shows that when the capacitance $C_2$ of the transmission capacitor is infinitely great, a linear function is obtained where the measuring error owing to the capacitance of the transmission capacitor is zero.

I claim:

1. In combination with a centrifugal separator having a hollow rotor forming a centrifugal separating chamber, a stationary housing for the rotor, and means mounting the rotor in the housing for rotation relative to the housing, a device for determining the position of the interface between two separated components of different dielectric constants in the separating chamber, said device comprising a measuring capacitor including two capacitor elements mounted to form between said elements a space positioned in said chamber to receive parts of the separated components and their interface, whereby said parts form between the capacitor elements a dielectric which varies in strength with displacements of said interface, a transmission capacitor including two capacitor elements mounted in opposed spaced relation on the outside of the rotor and on the housing, respectively, a capacitance-measuring instrument, an electrical current source, and electrical connections connecting said capacitors in series in a circuit including said instrument and current source.

2. The combination according to claim 1, in which the capacitance of the transmission capacitor is high in relation to the capacitance of the measuring capacitor.

3. The combination according to claim 1, in which one of the measuring capacitor elements is formed by a surface of the rotor extending generally radially of the rotor axis.

4. The combination according to claim 1, in which one of the measuring capacitor elements if formed by a conical disc having a surface extending generally radially of the rotor axis.

5. The combination according to claim 1, in which one of the measuring capacitor elements is formed by a wire extending generally radially of the rotor axis.

6. The combination according to claim 1, in which one of the measuring capacitor elements is formed by a conical disc having a surface extending generally radially of the rotor axis, the other element of the measuring capacitor being an electrically insulated wire in close proximity to said disc surface.

7. The combination according to claim 1, in which said measuring capacitor elements are formed, respectively, by a metal rod extending generally parallel to the rotor axis and by a part of the rotor having a conical surface generally coaxial with the rotor axis.

8. The combination according to claim 1, comprising also electrical insulation mounting the transmission capacitor elements on the rotor and the housing, respectively.

9. The combination according to claim 1, comprising also an insulating member forming a passage through a wall of the rotor, said electrical connections including a conductor extending through said passage.

10. The combination according to claim 1, in which one of the measuring capacitor elements is a part of the rotor having a surface extending generally radially of the rotor axis, the housing having a bearing assembly for the rotor and through which the housing is electrically connected to said rotor part, the other measuring capacitor element and said transmission capacitor elements being electrically insulated from the rotor and housing, said electrical connections including a conductor connecting one side of said instrument to the housing, a conductor connecting the other side of the instrument to one of the transmission capacitor elements, and a conductor connecting the other transmission capacitor element to said other measuring capacitor element.

11. The combination according to claim 1, in which each element of the transmission capacitor is divided into two portions having equal areas, to form two capacitors, said last capacitors being grounded and connected in opposition to each other in said circuit whereby their capitances to ground cancel out each other.

12. The combination according to claim 1, in which said transmission capacitor elements are rings concentric to the rotor axis.

References Cited by the Examiner

UNITED STATES PATENTS

| | | | |
|---|---|---|---|
| 802,473 | 10/05 | Raasloff | 233—20 X |
| 1,648,369 | 11/27 | Svedberg et al. | 233—1 X |
| 2,113,175 | 4/38 | Elrod | 233—20 |
| 2,316,875 | 4/43 | Laboulais | 324—61 X |
| 2,487,364 | 11/49 | Ortenblad | 233—20 |
| 2,532,792 | 12/50 | Svensjo | 233—19 |
| 2,542,456 | 2/51 | Ayres | 233—19 |
| 2,628,023 | 2/53 | Dahlstedt | 233—19 |
| 2,904,751 | 9/59 | Parsons. | |
| 2,973,477 | 2/61 | Lerner | 324—61 |
| 2,985,305 | 5/61 | Nock et al. | 210—96 X |
| 3,019,902 | 2/62 | McPhee et al. | 210—96 X |
| 3,025,464 | 3/62 | Bond | 324—61 |

HARRY B. THORNTON, *Primary Examiner.*

ROBERT F. BURNETT, *Examiner.*

UNITED STATES PATENT OFFICE
CERTIFICATE OF CORRECTION

Patent No. 3,189,268                                       June 15, 1965

Vilgot Raymond Nilsson

It is hereby certified that error appears in the above numbered patent requiring correction and that the said Letters Patent should read as corrected below.

Column 3, line 42, after "capacitor" insert -- element --; column 6, line 62, for "210-96 X" read -- 210-97 --; same column 6, after line 63, insert the following:

FOREIGN PATENTS 1,005,931      4/57      Germany

Signed and sealed this 8th day of February 1966.

(SEAL)
Attest:

ERNEST W. SWIDER                                   EDWARD J. BRENNER
Attesting Officer                                        Commissioner of Patents